(12) United States Patent
Meyer et al.

(10) Patent No.: US 12,522,066 B2
(45) Date of Patent: Jan. 13, 2026

(54) PEDAL ARRAY WITH A POSITIONING DEVICE

(71) Applicant: Robert Bosch GmbH, Stuttgart (DE)

(72) Inventors: Sina Meyer, Cleebronn (DE); Philipp Scheiner, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/715,297

(22) PCT Filed: Sep. 26, 2022

(86) PCT No.: PCT/EP2022/076692
§ 371 (c)(1),
(2) Date: May 31, 2024

(87) PCT Pub. No.: WO2023/099058
PCT Pub. Date: Jun. 8, 2023

(65) Prior Publication Data
US 2025/0026198 A1 Jan. 23, 2025

(30) Foreign Application Priority Data
Dec. 2, 2021 (DE) .................... 10 2021 213 651.6

(51) Int. Cl.
*B60K 26/02* (2006.01)
*B60T 7/04* (2006.01)
*G05G 1/40* (2008.04)

(52) U.S. Cl.
CPC .............. *B60K 26/02* (2013.01); *B60T 7/042* (2013.01); *G05G 1/40* (2013.01); *B60K 2026/026* (2013.01)

(58) Field of Classification Search
CPC ... B60K 26/02; B60K 2026/026; B60T 7/042; G05G 1/40
See application file for complete search history.

(56) References Cited

U.S. PATENT DOCUMENTS 10,562,260 B2 * 2/2020 Park .................... B29D 23/001
10,994,611 B1    5/2021 Kim
(Continued)

FOREIGN PATENT DOCUMENTS

| DE | 10328554 A1 * | 1/2005 | ............. G05G 1/30 |
| DE | 102018201897 A1 * | 8/2019 | ............ B60K 26/02 |
| WO | WO-2021144015 A1 * | 7/2021 | ............ B60K 26/02 |

OTHER PUBLICATIONS

Machine translation of DE 102018201897 obtained from fit database (Year: 2019).*
(Continued)

*Primary Examiner* — Thomas C Diaz
(74) *Attorney, Agent, or Firm* — Maginot, Moore & Beck LLP

(57) ABSTRACT

In a pedal array, in particular for a motor vehicle, having an actuating element for the actuation of a function by a user, and a positioning device for positioning the actuating element in a first position and a second position, the first position of the actuating element is flush with or below or slightly above a surface formed by an area surrounding the actuating element, and the second position of the actuating element is further above the surface formed by the area surrounding the actuating element than the first position.

14 Claims, 1 Drawing Sheet

(56) References Cited

U.S. PATENT DOCUMENTS

| | | | |
|---|---|---|---|
| 11,550,353 B1* | 1/2023 | Kim | G05G 1/015 |
| 12,024,017 B2* | 7/2024 | Rohr | H01H 3/02 |
| 2003/0177974 A1* | 9/2003 | Dominique | E05B 85/107 |
| | | | 70/264 |
| 2020/0001838 A1* | 1/2020 | Hurd | B60T 7/12 |

OTHER PUBLICATIONS

International Search Report corresponding to PCT Application No. PCT/EP2022/076692, mailed Feb. 7, 2023. (German and English language document). (5 pages).

\* cited by examiner

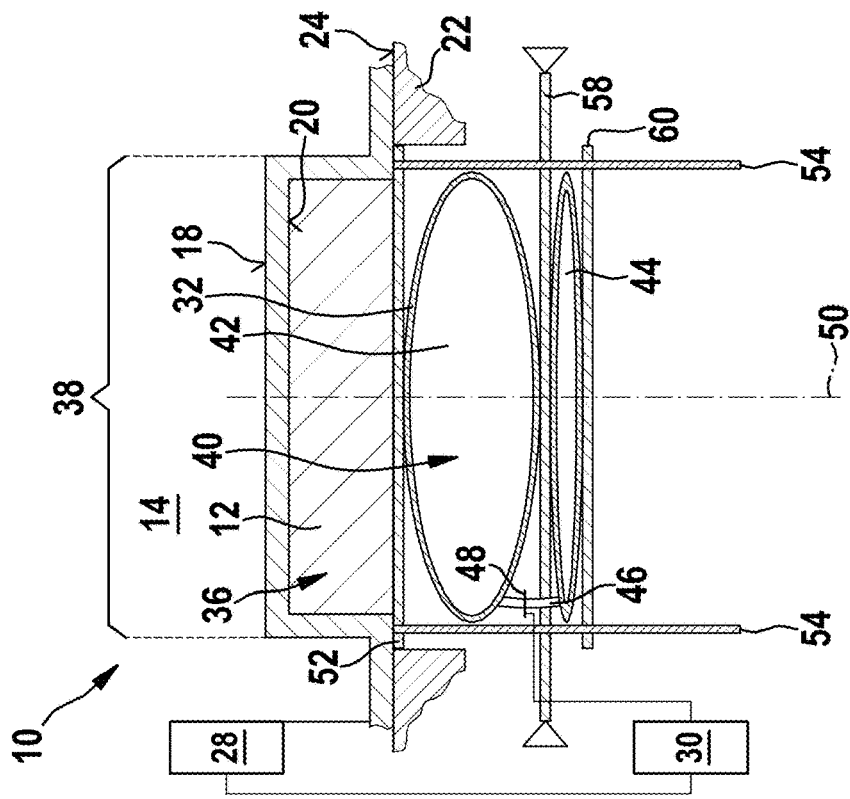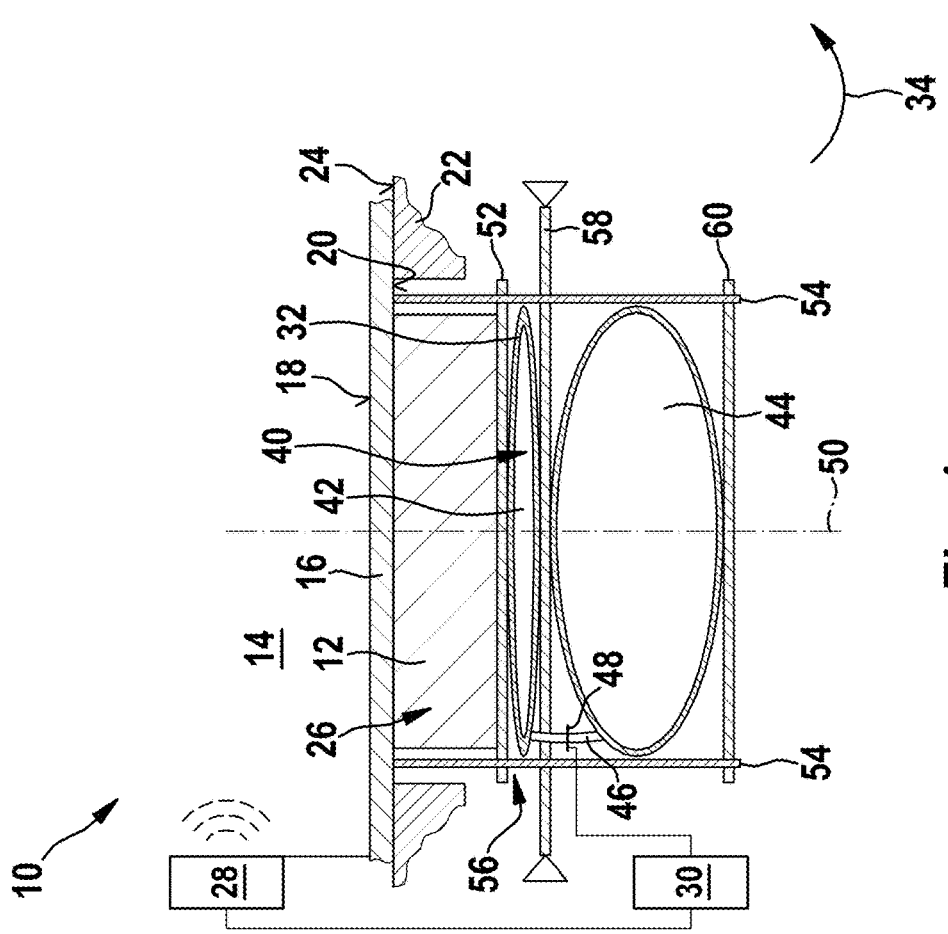

PEDAL ARRAY WITH A POSITIONING DEVICE

This application is a 35 U.S.C. § 371 National Stage Application of PCT/EP2022/076692, filed on Sep. 26, 2022, which claims the benefit of priority to Serial No. DE 10 2021 213 651.6, filed Dec. 2, 2021 in Germany, the disclosures of which are incorporated herein by reference in their entirety.

BACKGROUND

The disclosure relates to a pedal array, in particular for a motor vehicle, having an actuating element for actuating a function by a user and a positioning device for positioning the actuating element in a first position and in a second position. The disclosure also relates to the use of such a pedal array in a motor vehicle.

In motor vehicles, such as passenger cars or trucks, pedal arrays are used with which a driver as a user can accelerate or brake the motor vehicle or vehicle. For this purpose, a brake pedal is provided in a footwell of the vehicle as a pedal array for braking and an acceleration pedal or accelerator pedal as a pedal array for accelerating. Both the brake pedal and the accelerator pedal protrude from a floor surface creating the footwell by means of a pedal bar. A pedal tread is arranged at right angles to the pedal bar. The user exerts pressure on the respective pedal tread surface with their foot as required, thereby moving the pedal tread surface and the pedal bar coupled to it from a starting position to a working position. This provides a braking function with a vehicle brake system coupled to the brake pedal and an acceleration function with a vehicle drive coupled to the accelerator pedal. When released by the user, the pedal tread is pushed back from the working position to the starting position by means of the pedal bar and a spring-loaded support.

Further developments in vehicles offer new possibilities for the design of such pedal arrays. New requirements are also being made. Such further developments include brake-by-wire systems, in which a coupling between a pedal and a brake takes place by means of purely electronic signal transmission, autonomous driving and electrically powered vehicles.

The disclosure relates to the task of creating an operationally reliable pedal array with which a function, in particular a braking function or an acceleration function, can be provided in a motor vehicle.

SUMMARY

According to the disclosure, a pedal array is provided, in particular for a motor vehicle, having an actuating element for actuating a function by a user and a positioning device for positioning the actuating element in a first position and in a second position. The first position of the actuating element is flush with or below or slightly above a surface formed by means of a surrounding area of the actuating element and the second position of the actuating element is further above the surface formed by means of the surrounding area of the actuating element compared to the first position.

According to the disclosure, the actuating element is thus intended to be operated or actuated by a user of the vehicle when the user wishes to achieve a specific function. Preferably, the function is a braking function or an acceleration function. The braking and acceleration function is preferably provided with just one actuating element. In particular, the actuating element is arranged in a footwell of a driver's side of the vehicle on its front floor area. The actuating element is surrounded by a surface or surrounding surface in its surroundings or in its surrounding area. Relative to this surface, the actuating element is arranged flush with or below or slightly above the surface in the first position and above or further above the surface in the second position compared to the first position. The second position of the actuating element is the position in which the user can operate the actuating element and thus represents its starting position. In this second position, the user can touch the actuating element as a pedal with their foot and exert pressure on it. This pushes the actuating element into a working position in the direction of the surrounding surface, thus causing a function in the vehicle. In contrast, the first position of the actuating element is a rest position in which the actuating element is arranged flush with or below, in particular slightly below, or slightly above the surrounding surface. This means that there is more space surrounding the actuating element. In particular, the space is the footwell on the driver's side of the vehicle, is then more spacious in its front area. In addition, the user's foot cannot get caught in the actuating element in this resting position. The actuating element is-particularly preferably arranged flush with the surrounding surface. This creates a level surface without steps that is particularly easy to keep clean. Furthermore, the actuating element is preferably arranged marginally or slightly above the surrounding surface in the first position. This creates a small protrusion that allows the user to easily recognize where the actuating element to be operated is located without the risk of getting caught. Compared to the first position, the actuating element in the second position is located further above the surrounding surface and is therefore more prominent or protruding.

A positioning device coupled to the actuating element is provided for changing the positions of the actuating element. The positioning device is adapted to bring the actuating element into the first and second position as required. In addition, at least one intermediate position between the first and the second position of the actuating element is preferably provided as required.

Furthermore, the actuating element is advantageously block-shaped according to the disclosure. This creates a solid pedal block with a stable contact surface and a particularly good power-transmitting effect. When a user steps on the block-shaped actuating element, the force exerted is distributed across the block and transmitted particularly extensively to a transmission and control device coupled to the actuating element.

Preferably, the actuating element can be brought into the second position without undercuts from the surrounding surface and is positioned there without undercuts. Particularly, a block shaped actuating element can be configured as a pedal block, which is able to be moved out of the surrounding surface. This means that nothing can slip under the actuating element in the event of an accident or crash. It is also prevented from catching on the actuating element. In addition to this increased safety, the footwell can easily be kept clean.

Advantageously according to the disclosure, the actuating element and its surroundings are covered with a flexible surface element, such that when the actuating element is positioned in the second position, the flexible surface element is to be moved out of the surface formed by the surroundings of the actuating element by means of the actuating element. The flexible surface element then protrudes from the surface in the area of the actuating element. The actuating element lies below the flexible surface element on the surface element and is located together with the surface element in the second position above the surrounding surface. In contrast, in the first position, the actuating element and its surroundings are covered with the surface element in such a way that the actuating element and its surroundings are flush with each other. A flat surface without protrusion is created. A visible marking is preferably made on the flat surface of the surface element in the area of the actuating element. This makes it easier for the user to recognize where a surface to be actuated or an actuation area is located. Alternatively, the actuating element is arranged slightly below or above its surroundings and is covered by the surface element together with the surroundings. This creates a surface with a small hollow or only a slight protrusion as a distinguishing feature.

In particular, the flexible surface element has a visible side and an inner side opposite the visible side, which is applied to the actuating element and its surroundings. This creates a largely flat visible side in the first position and a visible side with a structure in the second position, in which an actuating area protrudes from the surrounding surface in the area of the actuating element.

Thus, when the actuating element is positioned in the second position by means of the positioning device, the actuating element with the surface element protrudes from the surrounding surface. This means that the positioning device, the actuating element coupled to it and the flexible surface element act as a movable surface that protrudes from an otherwise flat surface. Such a surface is also known as a morphing surface.

Even in the second position, such a morphing surface creates an actuation area that protrudes from the surrounding surface and has a particularly compact design. In particular, the surface element covering the actuating element means that no object can get under an area of the actuating element, or get caught there and block the actuating element. It also prevents the soles of open shoes or the user's feet from getting caught. The pedal array according to the disclosure is thus improved in terms of safety compared to known pedal arrays.

Preferably, the flexible surface element is designed with a textile material and/or a rubber-like material. This ensures particularly good deformability and adaptation to the actuating element in its respective position.

Advantageously according to the disclosure, the positioning device is adapted to bring the actuating element into the second position as soon as an associated mode is activated. The preferred mode is a situation in which the user touches the actuating element directly or by means of the flexible surface element. In particular, the mode should be activated as soon as the user comes close to the actuating element or a corresponding posture is detected.

This means that the actuating element can be brought into the second position in advance and thus into the starting position required for the work to be performed. An associated function can then be triggered particularly quickly.

In a vehicle with an autonomous driving function, the associated mode is particularly preferably an activated mode in which the driver wants to operate the vehicle himself or take over control of the system. In this activated mode, the control element is in the second position and can be operated by the driver as required. In contrast, in an inactive or autonomous mode, the actuating element is arranged in the first position at the level of the surrounding surface. This means that the operating element is invisible in inactive mode and morphs out of the surroundings in activated mode. This design creates a particularly comfortable footwell with plenty of space and no annoying pedals, with an attractive design and particularly high safety standards. As the proportion of autonomous driving increases, the driver's demands on such aspects grow. In addition, the surface that is extended by activation provides haptic feedback that gives the driver, who may only want or need to take control for a short time, a feeling of the force applied, which is translated into actuation.

According to the disclosure, a detection device for detecting contact with the actuating element and/or a movement in the direction of the actuating element is also advantageously provided for activating the associated mode. The actuating element can either be touched directly by the driver or indirectly by means of the surface element on its actuating area covering the actuating element. The detection device is preferably designed with a camera sensor that uses image recognition to detect whether the actuating element is being touched or whether the user is approaching the actuating element. Furthermore, the detection device is preferably designed with a proximity sensor for detecting when the user approaches the actuating element. This means that the activated mode can be switched on when the user is a certain distance from the actuating element and the actuating element can be moved to the second position. The detection device is particularly preferably designed with a capacitance sensor. In particular, this allows a capacitance similar to a capacitive touchscreen to be determined on the surface element or on the actuation element In addition, the detection device is preferably simply designed with a pressure sensor that detects the pressure exerted on the actuating element by the user. The detection device is particularly preferably a combination of the aforementioned sensors or a part of the aforementioned sensors. This means that the detection device must be designed to meet specific requirements.

Furthermore, the positioning device is advantageously designed with a pneumatic device according to the disclosure. Preferably, a pneumatic actuator is provided for this purpose, which in particular has a gas cushion with a variable volume. The gas cushion is a cost-effective alternative to an air cushion. By way of such a gas cushion, the actuating element is to be moved according to the change in volume of the gas cushion. The advantage here is that such a movement can be controlled very precisely in terms of path and speed. This means that an extension movement of the actuating element into the second position and a retraction movement into the first position can be generated very precisely and smoothly without jerky movements. In addition, these movements on the gas cushion or actuator are almost silent, provided that the required pump is installed accordingly. Furthermore, the pneumatic actuator itself requires very little installation space, which benefits freedom of movement in the footwell. In addition, the pneumatic actuator is preferably also used as a pressure sensor for a pressure to be exerted by the user on the actuating element. If the gas cushion or actuator is filled with gas or inflated, the actuating element or pedal is extended and can be operated. Pressure on the pedal can be detected particularly accurately the air pressure in the actuator increases, possibly via a compensation volume. It also retains the haptic feel of a classic pedal. This creates a very compact, robust and cost-effective actuator-sensor system.

The pneumatic device is preferably designed with an antagonistic double actuator. For this purpose, two gas cushions are placed on top of each other, one of which is always inflated and the other cushion contains correspondingly less gas. In particular, the other cushion is largely empty. If the initially empty cushion is filled with gas, the volume of the empty cushion increases, while the volume of the initially inflated cushion decreases. If the cushion with decreasing volume is assigned to the actuating element, the actuating element is moved back into the first position. To extend, the cushion with reduced volume is filled with gas, increases in volume again and thus moves the actuating element to the second position. Preferably, the gas is not pumped directly from one cushion into the other, but rather into the respective cushion by means of a pump. The gas then escapes from the filled cushion through an associated valve. With this antagonistic double-actuator principle, the actuating element can be brought into the respective position in a controlled, compact, robust, cost-effective and quiet manner.

In addition, according to the disclosure, the positioning device is advantageously designed with an electromechanical device, which preferably comprises a servomotor. This means that a position of associated components can be changed mechanically with an electric motor as a control element as required and efficiently so that the actuating element can be moved alternately into the respective position.

Moreover, according to the disclosure, the positioning device is preferably designed with an electromagnetic device or with an electromagnetic actuator. This makes the positioning device particularly easy to control and at the same time requires very little installation space.

Furthermore, according to the disclosure, the positioning device is advantageously designed to be even more space-saving with an actuator material, preferably with a shape-memory material. Such materials are preferably shape memory alloys (SMA).

These are special metals that occur in two different crystal structures. A phase transition between the two crystal structures preferably takes place by means of a temperature change and particularly preferably by means of mechanical stress. This results in a deformation that returns to its previous shape even in the event of severe deformation. Preferably, the shape memory material forms the actuating element or pedal or the plate surface by means of a temperature change and/or a magnetic field.

According to the disclosure, the positioning device is thus advantageously designed with a thermally and/or magnetically controlled device. A high temperature phase known as austenite can be achieved by increasing the temperature of the shape memory material and a low temperature phase known as martensite can be achieved by reducing the temperature. Two crystal structures are possible within the martensite phase, which merge into one another through heating and subsequent cooling (austenite-martensite transition). Apart from or in addition to such a thermally excitable shape-memory alloy, a magnetically excitable shape-memory alloy can also be used, in which a change in shape occurs due to an external magnetic field. Such magnetic shape memory alloys are referred to as magnetic shape memory alloy (MSMA).

The preferred shape memory alloy is a nickel-titanium alloy (NiTi, Nitinol) and particularly preferably a nickel-titanium-copper alloy (NiTiCu). Such alloys have a particularly good shape memory. The respective transformation temperature for the austenite-martensite transition depends on the ratio of the individual metals to each other. A pseudo-elastic or pseudo-plastic behavior at room temperature can thus be generated as required by varying the quantity ratio or stoichiometry.

A copper-zinc alloy (CuZn), copper-zinc-aluminum alloy (CuZnAl) and/or copper-aluminum-nickel alloy (CuAlNi) is also preferably used as a shape memory alloy. Such alloys are particularly inexpensive. An iron-nickel-aluminum alloy (FeNiAl), iron-manganese-silicon alloy (FeMnSi) and/or zinc-gold-copper alloy (ZnAuCu) can also be used.

A shape-memory polymer (FGP, shape-memory polymers, SMP) is particularly preferred as a shape-memory material. Thanks to their low thermal conductivity, such polymers have particularly short switching times. Preferably, the shape memory polymer is excited by heating it above an associated switching temperature. The shape-memory polymer is particularly preferably a polymer that is excited by light of a specific wavelength. Butyl acrylates, which have cinnamic acid groups on their side chains, are used as such polymers. These cinnamic acid groups cross-link under UV light of a certain wavelength and thus fix a shape. The cross-links can be loosened by irradiation with a different wavelength in such a way that they return to their original form. According to the disclosure, the positioning device with such a shape memory polymer is advantageously designed with a light-induced controlled device. This makes the positioning device particularly quick and energy-saving to control.

Furthermore, according to the disclosure, the positioning device is advantageously designed with a magnetohydrodynamically controlled device. A metal alloy or liquid metal that is liquid at room temperature, in particular GaInSn (gallium, indium, tin), has proven to be particularly suitable for this purpose. When pressure is applied to the actuating element and the liquid metal is compressed as a result, the conductivity of the liquid metal is changed. This means that the liquid metal preferably also serves as a sensor. Preferably, the positioning device is designed with a magnetohydrodynamic liquid metal actuator, in which a pressure can be controlled by means of an electrical control of the liquid metal. In particular, a flexible surface is formed by means of various individual surface elements that can be controlled in different ways, of which at least one individual surface element serves as an actuating element.

Such a magnetohydrodynamic device can be triggered electrically, causing the liquid metal to move in one direction and thus exert pressure on a surface. A series connection is preferably used to increase the pressure. A large number of individual elements are particularly preferable, especially in the form of small pin surfaces. The many elements together form the actuating element or pedal and can be actuated differently depending on requirements. By means of a different and successively increasing extension height of the individual elements, a flat pedal then changes into an inclined pedal. Preferably, the elements are covered with a flexible surface element or, particularly stabilizing, with a support plate.

According to the disclosure, the function to be actuated with the actuating element is preferably a braking function. This enables particularly safe braking even with open shoes, such as flip flops. Especially in emergency braking situations, safety is significantly increased with such a brake pedal. Other advantages already mentioned have also been achieved.

Furthermore, according to the disclosure, the function to be actuated with the actuating element is advantageously an acceleration function. This also enables particularly safe acceleration. Such an accelerator pedal also offers the advantages already mentioned.

The function to be actuated with the actuating element is particularly advantageous as a braking function and as an acceleration function, depending on requirements. This creates a pedal array with which only one pedal is required for braking and accelerating. In particular, electric vehicles will only have one pedal array in the future, which is used for acceleration and braking via recuperation. A braking process is to be triggered by releasing the actuating element through recuperation. Emergency braking is preferably recognizable by a very strong pressure exerted by the driver, while acceleration, on the other hand, requires only little pressure. It is particularly preferable that the force exerted by the driver on the actuating element and measured by a corresponding sensor system is transmitted to a corresponding actuator, such as a brake device or acceleration device, by means of a brake-by-wire device. In addition, an emergency brake assistant is preferably provided as a further driving function, with which redundant automatic emergency braking can be achieved as an additional safety aspect. In addition, a second actuating element that morphs in accordance with the disclosure is particularly preferably provided, which can be actuated as an emergency brake.

The disclosure also relates to the use of such a pedal array in a motor vehicle, preferably as a brake pedal and/or accelerator pedal. The pedal moves out of the floor of a vehicle footwell without an undercut and only when required, thus achieving a particularly high level of safety when driving. There is also plenty of space in the footwell, giving the user's legs plenty of room to move. It also meets the requirements for a minimalist design that avoids potentially dangerous distractions when driving the vehicle.

BRIEF DESCRIPTION OF THE DRAWINGS

An exemplary embodiment of the solution according to the disclosure is explained below with reference to the appended schematic drawings. The drawings show:

FIG. 1 a schematic cross-section of an exemplary embodiment of a pedal array according to the disclosure in the retracted state, and FIG. 2 the view according to FIG. 1 in extended state.

DETAILED DESCRIPTION

FIGS. 1 through 2 show a highly schematized pedal array 10 of a motor vehicle or vehicle not shown. The pedal array 10 can be used to actuate a braking function and an acceleration function as required. For this purpose, the pedal array 10 comprises a pedal block or a block-shaped actuating element 12, which is completely covered with a flexible surface element 16 in the direction of a merely indicated interior 14 of the vehicle. The flexible surface element 16 has a visible side 18 facing the interior 14 and an inner side 20 opposite the visible side 18. The inner side 20 is in contact with the actuating element 12 and additionally with a surrounding surface or surface 24 formed by means of surroundings 22 of the actuating element 12. The flexible surface element 16 thus covers the surface 24 and the actuating element 12.

In a first position 26, the actuating element 12 is arranged flush with the surface 24, so that the visible side 18 of the flexible surface element 16 is flat (FIG. 1). Designed in this way, there is a particularly large interior 14 without a bottom step in the first position 26. The first position 26 is a rest position in which the actuating element 12 cannot be actuated or operated by a user of the vehicle.

If the user or driver wants to actuate the pedal array 10, he moves his foot towards the actuating element 12. The foot's approaching movement is detected by a detection device 28, which in this case is a combination of a camera sensor and a pressure sensor. From there, a detected signal is forwarded to a control device 30, which is coupled to a positioning device 32 in a signal-transmitting manner.

When a corresponding signal is transmitted from the control device 30 to the positioning device 32, a mode 34 is activated. In this activated mode 34, the actuating element 12 is moved from the first position 26 to a second position 36 by the positioning device 32. The second position 36 is above the surface 24 (FIG. 2). Thus, when the actuating element 12 is positioned in the second position 36, it moves out of a plane of the surface 24 and raises the flexible surface element 16 in the area of the actuating element 12. The visible side 18 thus has a structure in which an actuating area 38 protrudes from the surface 24 in the area of the actuating element 12. In other words, the pedal array 10 creates a morphing surface in which a three-dimensional pedal emerges from the surface 24 as an actuating element 12 as soon as the user approaches it.

In this protruding, second position 36 of the actuating element 12, the actuating element 12 can be operated as a pedal by the driver. When stepping on the actuating element 12, a braking or accelerating function is transferred to a braking or accelerating device not shown, by exerting pressure. A transmission and control device, which is also not shown, is provided for this purpose and can be a hydraulic system or a brake-by-wire system.

The positioning device 32 is designed as a pneumatic device 40 with an antagonistically acting pneumatic double actuator. The device 40 comprises a first air cushion 42 arranged below the actuating element 12 and a second air cushion 44 arranged below the first air cushion 42. The two air cushions 42 and 44 each act as an air pocket for alternately absorbing air. In this case, air is contained in a predefined air volume, which is limited by the air cushions 42 and 44, in the two air cushions 42 and 44 as a whole. The air contained in the air volume can be moved back and forth between the two air cushions 42 and 44 as required. For this purpose, a line 46 is provided which connects the two air cushions 42 and 44 in an air-conducting manner, as well as a shut-off element 48 which is arranged in the line 46 and can be opened or closed as required.

In addition, a first movement element 52 that can be moved back and forth along an axis 50 is arranged above the first air cushion 42 between the first air cushion 42 and the actuating element 12. The first movement element 52 is coupled to the actuating element 12 in its movement. In addition, the first movement element 52 is associated with the first air cushion 42 and, depending on the change in volume of the first air cushion 42, is axially displaceable relative to the axis 50 in the direction of and counter to the direction of the actuating element 12. Two guide elements 54 extending parallel to the axis 50 and each arranged on the outside of the first movement element 52 are provided for guiding. Furthermore, the first movement element 52 is designed as a plate extending transversely to the axis 50, which is displaceably mounted on the guide element 54 on two of its opposite outer sides 56.

Axially between the first air cushion 42 and the second air cushion 44, a plate-shaped fixed element 58 extending transversely to the axis 50 is provided. The fixed element 58 is statically fixed and therefore not movable in the pedal array 10. Furthermore, an associated second movement element 60 is arranged axially below the second air cushion 44, which is also designed as a plate and is guided axially displaceably on the outside of the two guide elements 54.

The second air cushion 44 is thus clamped between the second movement element 60 and the fixed element 58.

In the first position 26 according to FIG. 1, the second air cushion 44 is filled with considerably more air than the first air cushion 42. When the second moving element 60 is moved in the direction of the fixed element 58, the second air cushion 44 is compressed. This forces the air contained therein through line 46 into the first air cushion 42 when the shut-off element 48 is open. The first air cushion 42 is clamped between the fixed element 58 and the first moving element 52. By means of the statically arranged fixed element 58, the air forcing or flowing into the first air cushion 42 in this way displaces the displaceably arranged first movement element 52 axially in the direction of the actuating element 12. This moves the actuating element 12 correspondingly axially upwards into the interior 14 into its second position 36 as shown in FIG. 2. The flexible surface element 16 is lifted upwards out of the surface 24 in the actuation area 38.

In this second position 36, the pedal array 10 can be actuated by the driver using the actuating element 12. When pressure is exerted by the driver's foot on the actuation area 38, an air pressure present in the first air cushion 42 is increased, which is detected by means of a pressure sensor not shown and/or alternatively by means of an equalizing volume not shown. Depending on the detected increase in air pressure, a braking process or acceleration process is triggered. Compared to the braking process, the acceleration process requires less pressure from the user and therefore less increase in air pressure in the first air cushion 42. The pneumatic device 40 used as the positioning device 32 thus also serves as a transmission device with which the desired braking function or acceleration function can be transmitted to an associated control device.

In order to move the actuating element 12 from the second position 36 back to the first position 26, the second air cushion 44 is refilled with air by the first air cushion 42. The second movement element 60 is moved axially downwards and thus away from the actuating element 12. Accordingly, the second air cushion 44 is filled with air from the first air cushion 42 through line 46. This increases the volume of the second air cushion 44. The volume of the first air cushion 42 decreases accordingly, so that the first movement element 52 and, coupled to it, the actuating element 12 are displaced in the direction of the fixed element 58. The actuating element 12 is thus moved back into its first position 26 until a flat visible side 18 is again formed with the surface element 16.

To control the pneumatic device 40 in this way, the control device 30 coupled to the detection device 28 is coupled in a signal-transmitting manner at least to the shut-off element 48. If required, a signal-transmitting coupling with the second movement element 60 is also provided.

Furthermore, a further preferred embodiment is provided in which the pneumatic device 40 does not have a closed air system of the two air cushions 42 and 44, as is the case in the exemplary embodiment already described. The further, preferred embodiment largely corresponds to the exemplary embodiment shown in FIGS. 1 to 2. In contrast, each air cushion 42 and 44 is assigned its own valve, which can be used to release air from the associated air cushion 42 or 44 to the outside. In addition, a central pump is provided through which air can be pumped from the outside alternately into the first air cushion 42 and into the second air cushion 44. When air is pumped into the first air cushion 42, a corresponding amount of air escapes from the other air cushion 44 through the associated valve by opening this valve. The actuating element 12 is thus moved from the first position 26, as shown in FIG. 1, to the second position 36, as shown in FIG. 2. In the opposite direction, the second air cushion 44 is to be filled with air by the central pump, while air is to be released from the first air cushion 42 through the associated valve.

The invention claimed is:

1. A pedal array for a motor vehicle, comprising:
    an actuating element configured to actuate a function by a user; and
    a positioning device having a pneumatic device configured to position the actuating element in a first position and a second position,
    wherein, when the actuating element is in the first position, the actuating element lies flush with or below or a first distance above a surface formed by way of surroundings of the actuating element,
    wherein, when the actuating element is in the second position, the actuating element lies a second distance above the surface formed by way of the surroundings of the actuating element, the second distance being greater than the first distance, and
    wherein the pneumatic device comprises a first air cushion and a second air cushion that are connected to one another in an air-conducting manner.

2. The pedal array according to claim 1, wherein the actuating element is block-shaped.

3. The pedal array according to claim 1, wherein the actuating element and its surroundings are covered with a flexible surface element in such a way that when the actuating element is positioned in the second position, the flexible surface element is to be moved out of the surface formed by the surroundings of the actuating element by way of the actuating element.

4. The pedal array according to claim 1, wherein the positioning device is configured to bring the actuating element into the second position as soon as an associated mode is activated.

5. The pedal array according to claim 4, further comprising a detection device configured to detect contact with the actuating element and/or a movement in the direction of the actuating element so as to activate the associated mode.

6. The pedal array according to claim 1, wherein the function to be actuated by the actuating element is a braking function.

7. The pedal array according to claim 1, wherein the function to be actuated by the actuating element is an acceleration function.

8. Use of a pedal array according to claim 1 in a motor vehicle.

9. The pedal array according to claim 1, wherein the pneumatic device further comprises a fixed plate, and the first air cushion is interposed between the actuating element and the fixed plate such that, in an inflated state, the first air cushion urges the actuating element into the second position.

10. The pedal array according to claim 9, wherein the pneumatic device further comprises a second movable plate, and the second air cushion is interposed between the fixed plate and the second movable plate.

11. The pedal array according to claim 10, further comprising a control device configured to actuate the second movable plate to move so as to compress the second air cushion and displace air from the second air cushion into the first air cushion when the positioning device moves the actuating element from the first position to the second position.

12. The pedal array according to claim 11, wherein the pneumatic device further comprises a line connecting the first and second air cushions in the air-conducting manner, and a shut-off element arranged in the line and configured to selectively close air conductance between the first and second air cushions.

13. The pedal array according to claim 12, wherein a first movable plate is arranged between the first air cushion and the actuating element.

14. The pedal array according to claim 13, wherein the first and second movable plates are axially movable along two guide elements that are arranged on opposite sides of the first and second air cushions.

* * * * *